C. W. SVENSON.
COASTER HUB BRAKE.
APPLICATION FILED MAY 18, 1912.
1,060,511.
Patented Apr. 29, 1913.
2 SHEETS—SHEET 1.
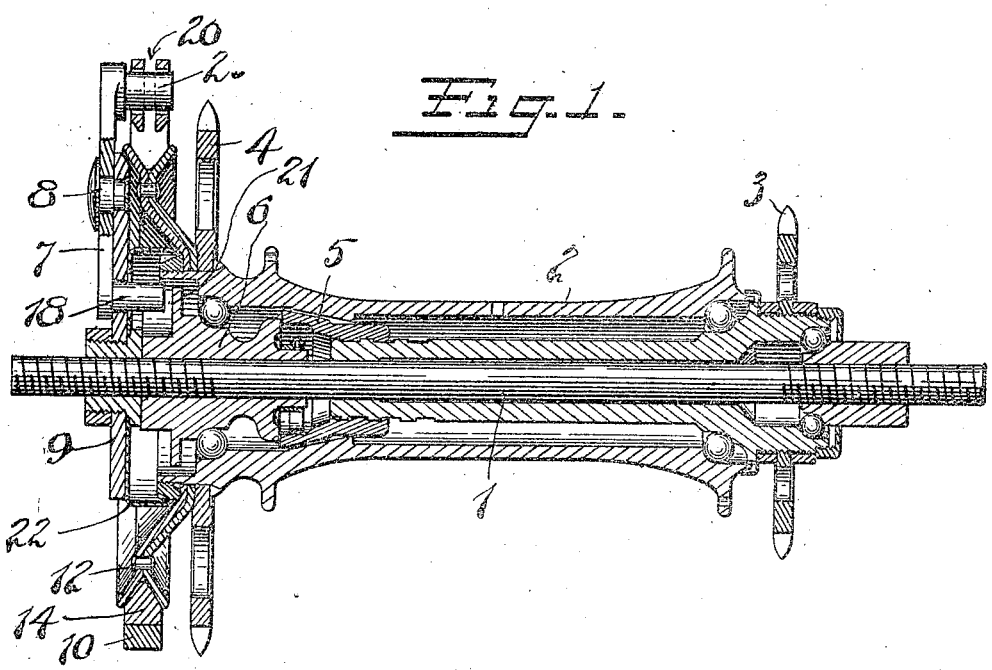
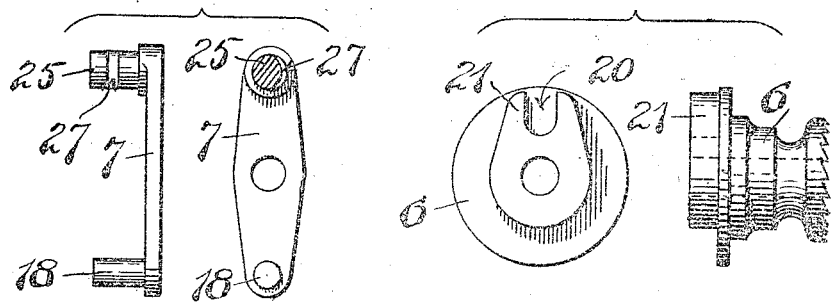
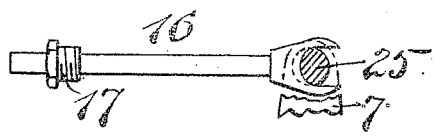
Witnesses:
Chas. A. Read
E. E. Morse
Inventor
C. W. Svenson
By his Attorneys C. W. SVENSON.
COASTER HUB BRAKE.
APPLICATION FILED MAY 18, 1912.
1,060,511.
Patented Apr. 29, 1913.
2 SHEETS—SHEET 2.
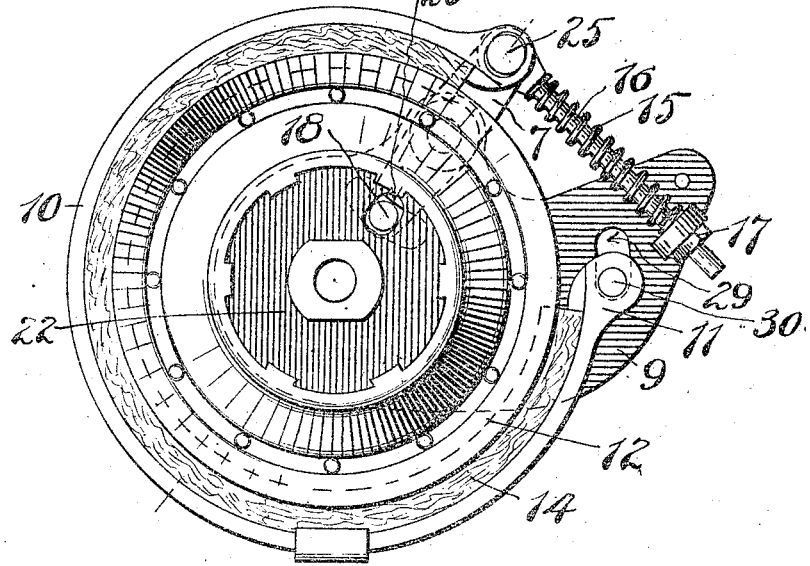
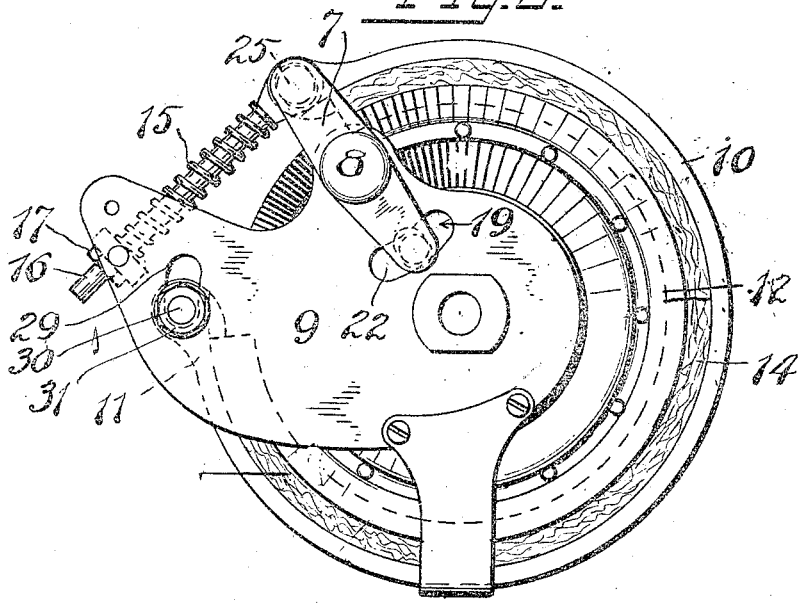
Witnesses:
Chas. A. Peard
E. E. Morse
Inventor
C. W. Svenson
By his Attorneys

UNITED STATES PATENT OFFICE.

CHARLES W. SVENSON, OF NEW BRITAIN, CONNECTICUT, ASSIGNOR TO THE AMERICAN HARDWARE CORPORATION, OF NEW BRITAIN, CONNECTICUT, A CORPORATION OF CONNECTICUT.

COASTER HUB-BRAKE.

1,060,511.　　　Specification of Letters Patent.　　Patented Apr. 29, 1913.

Application filed May 18, 1912. Serial No. 698,185.

*To all whom it may concern:*

Be it known that I, CHARLES W. SVENSON, a citizen of the United States, residing at New Britain, county of Hartford, State of Connecticut, have invented certain new and useful Improvements in Coaster Hub-Brakes, of which the following is a full, clear, and exact description.

My invention relates to an improvement in so-called hub coaster brakes, which improvement is particularly useful when said brake is to be associated with a power driven bicycle or the like wherein the utmost compactness is desired as well as the greatest efficiency.

In the drawings, Figure 1 is a central longitudinal section of a hub and brake constructed to embody my invention, said section being taken on the plane of the line *x—x*, Fig. 2. Fig. 2 is an end elevation of the brake, certain parts being removed. Fig. 3 is a similar view, certain parts removed from Fig. 2 being shown herein. Fig. 4 is a side and end elevation of a certain detail. Fig. 5 is a side and end elevation of another detail. Fig. 6 is a view of detached details.

1 is a central supporting main arbor.

2 represents a hub.

3 is a driver or sprocket, such as usually employed in starting a motor bicycle by foot power.

4 is a driver connected to the hub 3, and such as employed in driving a wheel by mechanical power.

Suitable clutch mechanism is provided between the driver 3 and the hub for connecting the driver with the hub when the latter is to be manually driven. This mechanism, in the present instance, comprises a movable clutch 5.

6 is a brake actuator for the operation of the brake, which actuator has a limited rotation upon the arbor 1.

The clutch 5 is suitably constructed so that when disengaged from the hub 2, it may be thrown into engagement by the relative backward rotation of the driver 3 with the actuator 6, so that a continued backward rotation of said driver 3 will rotate the actuator 6 on the spindle 1. This rotation is utilized to operate a brake lever 7 pivotally mounted at 8 upon a fixed arm or abutment plate 9 at one end of the hub. Movement of this lever 7 by the actuator 6 operates upon a band brake of unique construction. The lever 7 is connected at its outer end to one end of a brake strap 10, the other end 11 of said strap 10 being anchored to the plate 9. This strap 10 surrounds a uniquely formed brake drum or barrel 12 which latter is rigidly secured to the hub 2. This brake drum 12 is provided with a groove, preferably V-shaped. The inner wall of the strap 10 is preferably provided with a shoe 14 of leather, fiber or other suitable material, the cross-section of which is such that when contracted, it will enter the groove of the brake drum 12 and frictionally engage the surfaces thereof to check the rotation of the hub. By this construction, a much greater braking surface can be provided in a given width than could be provided by a flat brake drum of the same width. Again, by grooving the brake drum when the brake shoe is contracted thereon, a wedging action takes place which serves to increase the frictional resistance, thereby adding greatly to the efficiency of the device.

15 is a cast-off spring which tends to expand the brake strap and free it from the drum 12 when backward pressure on the driver 3 is released. This spring 15 is preferably mounted upon a guide pin 16 connected to the movable end of the brake strap and sliding in a suitable socket 17 carried by the abutment plate 9 against which abutment plate one end of the cast-off spring 15 presses. Since the normal tendency of the spring is to expand, it throws off the brake band and restores the lever 7 to its normal inactive position.

In the form shown, the lever 7 is provided with a pin 18 which passes through a slot 19 in the abutment plate 9. This pin extends into a slot 20 in a crank 21 at the end of the brake actuator 6. To prevent dirt from entering the slot 19, I provide a circular guard 22 pivotally mounted concentrically with the arbor 1 and provided with a radial slot 23 shown in Fig. 1 and in dotted lines in Fig. 3. This radial slot 23 crosses the slot 19, hence the material of the plate 22 practically covers the unoccupied parts of the slot 19 and protects the interior of the hub.

25 is a pin on the lever arm 7 which engages the movable end of the brake band. The movable end of the brake band is preferably perforated transversely to receive the pin 25 and is slotted longitudinally as at 26. The pin 25 is also preferably provided with a notch 27 so that the flattened end of the rod 16 may sink into the notch 27 and thus operate in effect as a key to prevent the lateral displacement of the free end of the brake strap on the pin 25. To secure the most effective results, the pin passage through the movable end of the brake strap should be radially enlarged so as to permit the adjacent part of the brake strap to move toward the axis of the hub and thus clutch evenly upon the brake drum when the lever 7 is being manually operated. In the drawings, I have shown the lever 7 approximately midway in the length of its throw, in which position it may be assumed that the brake band is being lightly applied to the brake drum. As will be seen, the slot 19 affords clearance on either side so that the lever 7 may swing in a direction to release the brake entirely, or may swing in the opposite direction to apply the brake even more powerfully. A very simple and effective means for securing a quick adjustment for the brake band is shown herein, wherein the abutment plate 9 is provided with a slot 29 for receiving a bolt 30, which passes through the fixed end of the brake band, as shown in Fig. 2, for the purpose of anchoring the same. The bolt may be held in any part of the slot 29 by a nut 31 so that by shifting the position of the pin in the slot, the fixed end of the brake strap may be shifted. This is particularly advantageous when the brake strap wears down, since it affords a simple means for taking up said wear. The direction of the slot 29 is obviously approximately circumferential relatively to the brake drum.

The guard 22 is preferably cup-shaped, as shown, so as to overstand the inner end of the hub and thereby further protect the same.

In operation, a back pedaling movement on driver 3 imparts a corresponding movement to the part 6, which in turn engages that part of the brake lever which enters the hub, and moves it in a direction to contract the brake, applying the necessary resistance to retard, and if necessary check, the forward rotation of the wheel hub.

What I claim is:

1. In a hub brake, a hub, a groove brake drum carried thereby, a brake band arranged to engage the brake drum in said groove and normally loosely surrounding the same, means for operating said brake band comprising a stationary abutment to which one end of said band is anchored, a lever carried by said abutment and operatively connected with the other end of said band, part of said lever projecting into said hub, and means in the hub for engaging that part of said lever within said hub to move it in a direction to contract the band on said drum.

2. In a hub brake, a hub, a groove brake drum carried thereby, a brake band arranged to engage the brake drum in said groove and normally loosely surrounding the same, means for operating said brake band comprising a stationary abutment to which one end of said band is anchored, a lever carried by said abutment and operatively connected with the other end of said band, part of said lever projecting into said hub, means partly contained in the hub for engaging that part of said lever within said hub to move it in a direction to contract the band on said drum, and means for adjusting the position of the anchored end of said brake band.

3. In a hub brake, a hub, a brake drum carried thereby, a brake band arranged to engage the brake drum and normally loosely surrounding the same, means for operating said brake band comprising a stationary abutment to which one end of said band is anchored, a lever carried by said abutment and operatively connected with the other end of said band, part of said lever projecting toward said hub, means partly contained in the hub for engaging said lever to move it in a direction to contract the band on said drum, and means normally expanding said brake band comprising a spring pressing at one end against the movable end of said band, and at the other end against the same part to which the fixed end of the band is anchored.

4. In a hub brake, a hub, a brake drum carried thereby, a brake band arranged to engage the brake drum and normally loosely surrounding the same, means for operating said brake band comprising a stationary abutment to which one end of said band is anchored, a lever carried by said abutment and operatively connected with the other end of said band, part of said lever projecting toward said hub, means partly contained in the hub for engaging said lever to move it in a direction to contract the band on said drum, means normally expanding said brake band comprising a spring pressing at one end against the movable end of said band, and at the other end against the same part to which the fixed end of the band is anchored, and a guide pin for said spring.

5. In a hub brake, a hub, a brake drum carried thereby, a brake band arranged to engage the brake drum and normally loosely surrounding the same, means for operating said brake band comprising a stationary abutment to which one end of said band is anchored, a lever carried by said abutment and operatively connected with the other end of said band, part of said lever projecting toward said hub, means partly contained in the hub for engaging said lever to move it in a direction to contract the band on said drum, means normally expanding said brake band comprising a spring pressing at one end against the movable end of said band, and at the other end against the same part to which the fixed end of the band is anchored, and a guide pin for said spring, said guide pin also holding said lever against accidental disengagement from the movable end of said brake band.

6. In a hub brake, a hub, a brake drum carried thereby, a stationary abutment, a brake band anchored at one end of said abutment and surrounding said drum, a lever pivotally mounted on said abutment and operatively engaging the unanchored end of said brake band, a pin on said lever, said stationary abutment having a slot through which said pin projects into the space within the circumference of said drum, and means engaging said pin and manually operable to swing said lever.

7. In a hub brake, a hub, a brake drum carried thereby, a stationary abutment, a brake band anchored at one end of said abutment and surrounding said drum, a lever pivotally mounted on said abutment and operatively engaging the unanchored end of said brake band, a pin on said lever, said stationary abutment having a slot through which said pin projects into the space within the circumference of said drum, and means engaging said pin and manually operable to swing said lever, said manually operable means extending through said hub to the opposite end thereof.

8. In a hub brake, a hub, a brake drum carried thereby, a stationary abutment, a brake band anchored at one end of said abutment and surrounding said drum, a lever pivotally mounted on said abutment and operatively engaging the unanchored end of said brake band, a pin on said lever, said stationary abutment having a slot through which said pin projects into the space within the circumference of said drum, means for engaging said pin and manually operable to swing said lever, and a rotatable guard mounted concentrically with said hub and having a substantially radial slot through which said pin also passes whereby parts of said guard will overstand the unoccupied parts of the slot in the stationary abutment.

CHARLES W. SVENSON.

Witnesses:
R. C. MITCHELL,
GEO. E. SPEAR.